(12) United States Patent
Mikawa

(10) Patent No.: US 7,061,836 B2
(45) Date of Patent: Jun. 13, 2006

(54) METHOD AND APPARATUS FOR PROCESSING INFORMATION DATA AND MANAGEMENT INFORMATION THEREOF

(75) Inventor: Takuma Mikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1092 days.

(21) Appl. No.: 10/042,369

(22) Filed: Jan. 11, 2002

(65) Prior Publication Data

US 2002/0097645 A1    Jul. 25, 2002

(30) Foreign Application Priority Data

Jan. 23, 2001    (JP)    .............................. 2001-014596

(51) Int. Cl.
*G11B 20/10* (2006.01)
*G11B 21/08* (2006.01)

(52) U.S. Cl. .................. 369/47.1; 369/30.03

(58) Field of Classification Search .............. 369/47.1, 369/47.12, 47.13, 47.15, 30.03, 30.01, 30.04–30.06, 369/30.19, 30.2, 53.2, 53.21, 53.41, 59.23, 369/83, 84; 713/1
See application file for complete search history.

(56) References Cited

U.S. PATENT DOCUMENTS 6,937,540 B1 * 8/2005 Kikuchi et al. .......... 369/30.03

* cited by examiner

*Primary Examiner*—Ali Neyzari
(74) *Attorney, Agent, or Firm*—Fitzpatrick, Cella, Harper & Scinto

(57) ABSTRACT

A method and apparatus for processing data are provided. Information data and recording medium management information concerning a recording medium are recorded on the recording medium. The recording medium management information includes initialization time-and-date information concerning time and date of initialization of the recording medium, creation time-and-date information concerning time and date of creation of the recording medium management information, and update time-and-date information concerning time and date of update of information data written on the recording medium.

24 Claims, 6 Drawing Sheets

DISK INFORMATION
- DISK MANAGEMENT INFORMATION
- FILE MANAGEMENT INFORMATION ⎫
- FILE MANAGEMENT INFORMATION ⎬ A SINGLE PIECE OF FILE MANAGEMENT INFORMATION FOR EACH FILE
- FILE MANAGEMENT INFORMATION ⎭
  ·
  ·
  ·

FIG. 6

FILE MANAGEMENT INFORMATION
- FILE TYPE
- FILE NAME
- FILE PATH
- FILE SIZE
- TIME & DATE INFORMATION
- THUMBNAIL IMAGE
    (FOR STILL PICTURE, MOTION PICTURE ONLY)
- PLAYBACK TIME INFORMATION
    (FOR MOTION PICTURE, AUDIO ONLY)

FIG. 7

METHOD AND APPARATUS FOR PROCESSING INFORMATION DATA AND MANAGEMENT INFORMATION THEREOF

BACKGROUND OF THE INVENTION

1. Field of the Invention

The present invention relates to a method and apparatus for processing data, and more specifically to processing of management information of recording media.

2. Description of the Related Art

Hitherto, in disk media such as DVDs and CD-ROMs, disk identifications (IDs) may be written in first tracks thereof as information for identifying each disk.

For such media on which disk IDs are written for identifying disks, the use of the disk IDs allows the identification of each of the disks. Storing a plurality of pieces of disk management information as a database in a PC (personal computer) or the like through the use of the disk IDs can achieve data management or the like of each disk.

For example, in a CD-ROM database system, based on a PC, which is configured to store disk IDs and part of the content of the disks as the disk management information, when a disk with a disk ID that does not exist in the database is inserted therein, the disk is identified as a disk to be read for the first time and is subjected to a processing in which the disk ID and the part of the content of the disk are added to the database as the disk management information.

On the other hand, when a disk with a disk ID that exists in the database is inserted therein, then without reading the content of the disk, the content can be identified to some extent from the disk management information in the database.

In this manner, the use of disk IDs allows the identification of disks, thereby enabling quick retrieval of information associated with each disk.

However, in a writable disk medium such as a DVD-RAM or CD-RW, when the content of a disk is altered, such alternation cannot be identified using the disk ID alone.

Specifically, in the example of the database mentioned above, if the content of a disk has been updated without the management of the database, the disk ID itself does not provide information indicating that the content of the disk has been updated. As a result, no determination can be made as to whether the content of the disk has been updated.

Thus, to determine whether the content of a disk has been updated, all pieces of file information written on the disk need to be compared. However, this consumes a large amount of time, thereby losing the advantages offered by the use of disk IDs.

In addition, when copying a disk, copying the disk content together with the disk ID of an original disk may make it impossible to differentiate between the disk created by the copying and the original disk. On the other hand, when copying with another disk ID added, there is also a problem in that the contents of the created disk and the original disk are identified as being different from each other even though the contents thereof are identical.

SUMMARY OF THE INVENTION

Accordingly, it is an object of the present invention to overcome the problems described above.

Another object of the present invention is to allow a more detailed management of recording media.

In order to achieve these objects, according to a first aspect of the present invention, there is provided a data processing apparatus including a data recording processing device for obtaining information data to be written on a first recording medium. Management information processing device generates recording medium management information concerning the recording medium. Recording medium management information includes initialization time-and-date information concerning the time and date of initialization of the recording medium, creation time-and-date information concerning the time and date of creation of the recording medium management information, and update time-and-date information concerning the time and date of update of information data written on the recording medium. Writing device writes the information data and the recording medium management information onto the recording medium.

Still another object of the present invention is to allow easy recognition as to copying of a recording medium or updating of the content thereof when they are performed.

Further objects, features and advantages of the present invention will become apparent from the following description of the preferred embodiments with reference to the attached drawings.

BRIEF DESCRIPTION OF THE DRAWINGS

FIG. 6 shows disk information.

FIG. 7 shows file management information.

DESCRIPTION OF THE PREFERRED EMBODIMENTS

The present invention will be described below in conjunction with embodiments thereof.

Figure 1:
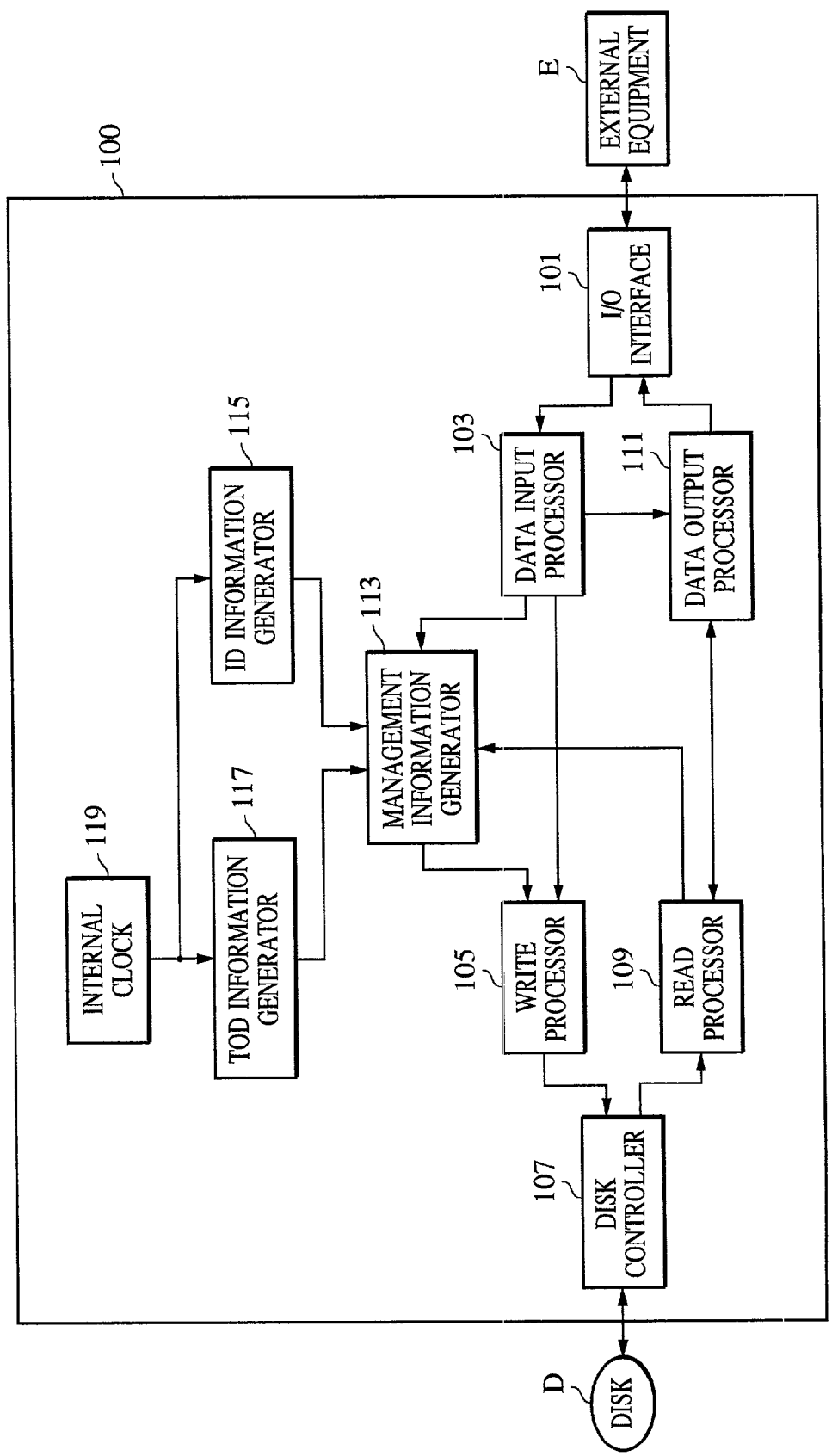
FIG. 1 is a block diagram showing a configuration of a read/write apparatus to which the present invention is applied.

Referring now to FIG. 1, a configuration of a read/write apparatus 100 to which the present invention is applied is illustrated in a block diagram.

In this embodiment, a DVD-RAM disk is used as a recording medium, and the read/write apparatus 100 shown in FIG. 1 can read, append, delete, and update files, and can initialize the recording medium.

Upon receipt of a file read request output from external equipment E, or upon receipt of a file delete request output from the external equipment E, the read/write apparatus 100 reads or deletes corresponding files, respectively. The file read request and the file delete request each contain information, such as a file name and file path, for identifying a file. The read/write apparatus 100 also initializes the recording medium in response to an input of recording medium initialization request from the external device E.

A description will now be made of a process of reading data written on a DVD-RAM disk D. In this embodiment, the disk D is accommodated in a DVD-ROM cartridge and is loaded and ejected through a slot (not shown) of the read/write apparatus 100.

Upon input of the file data read request to an input/output interface 101 from the external equipment E such as a PC, the file data read request is transmitted to a data input processor 103. The file data read request contains information, such as a file name and file path, for identifying a file.

In accordance with the file data read request, the data input processor 103 outputs to a data output processor 111 a read command for reading these file data requested.

Upon receipt of the file data read command, the data output processor 111 uses a read processor 109 to read the file data requested. The read processor 109 controls a disk controller 107 to read the requested file data from the disk D, and transmits the read file data to the data output processor 111.

The disk controller 107 has a known optical laser pickup and a disk drive mechanism, and writes and reads data to and from the disk D.

Upon receipt of the file data from the read processor 109, the data output processor 111 outputs the file data to the external equipment E through the input/output interface 101. Disk management information described hereinafter can also be read from the disk D in a similar process to that described above, and can be output to the external device E.

The process of writing data to the disk D will now be described.

Upon input of file data to the input/output interface 101 from the external device E, the input/output interface 101 outputs the file data to the data input processor 103. The data input processor 103 then outputs the input file data to a write processor 105, and also outputs to a management information generator 113 a command for updating disk management information associated with writing of the file data.

Upon receipt of the file data, the write processor 105 outputs the file data to the disk controller 107 and gives an instruction to the disk controller 107 to write the file data onto the disk D. When the file data input into the write processor 105 is to update a file data already written on the disk D, the write processor 105 outputs to the disk controller 107 the file data to be updated, and gives a instruction for updating the file data on the disk D.

On the other hand, upon receipt of the command for updating the disk management information from the data input processor 103, the management information generator 113 also receives the disk management information written on the disk D through the read processor 109, and stores the disk management information in a built-in memory in the management information generator 113. In this embodiment, the disk management information includes content identification information which is unique to each disk, initialization time-and-date (hereinafter referred to as "TOD") information which indicates time and date of initialization of the disk D, creation TOD information which indicates time and date of creation of the disk management information, and update TOD information which indicates time and date of update of the content of the file data written on the disk D. It should be noted that the term "TOD" is referred to as "time-and-date". The disk management information is written in a specific recording area of the disk D, for example, in a predetermined track adjacent to the innermost periphery of the disk D.

The management information generator 113 obtains current time and date information from a TOD information generator 117 to alter the update TOD information within the disk management information to the current time and date information. The time and date information and the content identification information will now be described.

The read/write apparatus 100 according to this embodiment includes an internal clock 119. The internal clock 119 outputs information indicating current time and date to an identification information generator 115 and the TOD information generator 117. The internal clock 119 can output time information in units of one thousandth of a second.

The identification information generator 115 uses the time and date information transmitted from the internal clock 119 and an ID, a random number and the like which are unique to the read/write apparatus 100, so as to create the content identification information that is unique data. As a method of creating such identification information, GUID (Global Unique ID) is commonly known. An ID unique to a disk can be obtained in such a manner that the management information generator 113 receives a disk ID, written in a predetermined recording area of the disk D, through the read processor 109 and outputs the disk ID to the Identification information generator 115. The TOD information generator 117 obtains the information indicating time and date from the internal clock 119 to create current time and date information. The time and date information of this embodiment includes information of the year, month, date, hour, minute, and second.

After updating the update TOD information in this manner, the management information generator 113 reads the disk management information from the internal memory and outputs the disk management information to the write processor 105. Upon receipt of the disk management information, the write processor 105 outputs the disk management information to the disk controller 107 at an appropriate timing, for example, at a timing when file data is not being written to the disk D, thereby writing the disk management information to the disk D.

In this embodiment, through such processing, file data is written and the disk management information is updated in association with writing of the file data.

A process of deleting data written on the disk D will now be described.

Upon receipt of a delete request for deleting file data written on the disk from the external equipment E, the input/output interface 101 outputs the file date delete request to the data input processor 103. The file data delete request includes information, such as a file name, file path, for identifying a file. In response to the file data delete request, the data input processor 103 outputs a file data delete command to the write processor 105 and also outputs an update command for updating the disk management information associated with deleting of the file data.

The write processor 105 outputs a control signal to the disk controller 107, in accordance with the file data delete command, to delete the requested file data from the disk D.

On the other hand, upon receipt of the update command, the management information generator 113 uses the read processor 109 to read the disk management information from the disk D and then receives and stores the disk management information in the internal memory. The management information generator 113 receives current time and date information from the TOD information generator 117 to update the update TOD information within the disk management information stored in the internal memory to the current time and date information. Upon updating the update TOD information, the management information generator 113 outputs the disk management information to the write processor 105.

Upon receipt of the disk management information, the write processor 105 outputs the disk management information at an appropriate timing to the disk controller 107, thereby writing the disk management information onto the disk D.

A process of initializing the disk D will now be described.

Upon receipt of an initialization request for initializing the disk D from the external equipment E, the input/output interface 101 outputs the disk initialization request to the data input processor 103. Upon receipt of the disk initialization request, the data input processor 103 outputs an initialization command to the write processor 105, and also outputs a management information initialization command associated with initialization of the disk D to the management information generator 113.

Upon receipt of the initialization command, the write processor 105 controls the disk controller 107 to delete all the file data written on the disk D.

On the other hand, upon receipt of the management information initialization command from the data input processor 103, the management information generator 113 receives the content identification information generated by the identification information generator 115 and obtains the current time and date information from the TOD information generator 117.

The management information generator 113 uses the internal memory to set values of the initialization TOD information, creation TOD information, and update TOD information, which are contained in the disk management information, to a value indicating the time and date information obtained from the TOD information generator 117. The management information generator 113 also sets a value of the content identification information within the disk management information to a value of the identification information input from the identification information generator 115.

The management information generator 113 generates the disk management information in such a manner and then outputs the disk management information to the write processor 105.

Upon receipt of the disk management information, the write processor 105 outputs the disk management information to the disk controller 107, thereby writing the disk management information in a given recording area of the disk D.

Thus, in this embodiment, the disk management information written onto the disk D includes content identification information which is unique to the disk D, initialization TOD information which indicates time and date of initialization of the disk D, creation TOD information which indicates time and date of creation of the disk management information onto the disk D, and update TOD information which indicates time and date of update of the content of the file data written on the disk D.

The creation TOD information and the update TOD information are automatically altered when file data is written, updated, or deleted on a disk.

Thus, even if the content of a disk is updated without the management of the read/write apparatus 100 of the present invention, it is possible to check the content of the updated disk, using only the disk management information, without thoroughly checking data written on the disk. This allows for a quicker check of the content of the disk.

In this embodiment, the disk management information is read from the disk D each time file data is recorded, updated, or deleted on the disk D, but the present invention is not limited thereto. For example, at the time of insertion of the disk D, the disk file information may be read and stored in the internal memory within the management information generator 113. In such a case, subsequent to the storing of the disk file information in the memory, the disk management information is processed and altered within the memory and the resulting disk management information is written on the disk D at an appropriate timing, for example, at a timing when the disk D is not being accessed for a predetermined time, or at a timing when the disk is ejected or when the power supply for the apparatus is turned OFF.

A second embodiment of the present invention will be described below.

Figure 2:
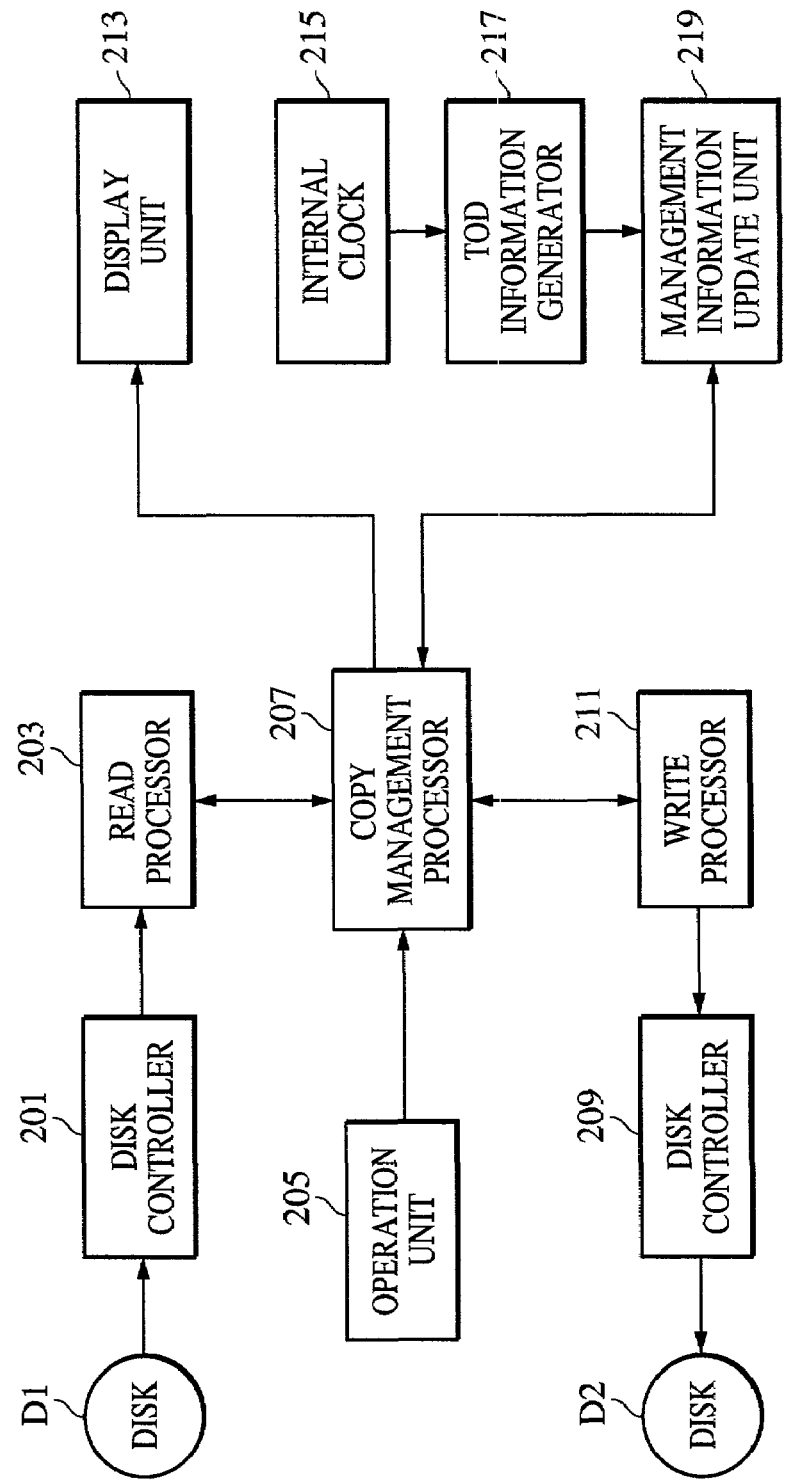
FIG. 2 is a block diagram showing another configuration of the read/write apparatus to which the present invention is applied.

Referring to FIG. 2, a configuration of a read/write apparatus 200 to which the present invention is applied is illustrated. The read/write apparatus 200 shown in FIG. 2 uses DVD-RAM disks as recording media as in the read/write apparatus 100 shown in FIG. 1. The read/write apparatus 200 utilizes the disk management information including content identification information which is unique to each disk, initialization TOD information which indicates time and date of initialization of the disk D, creation TOD information which indicates time and date of creation of the disk management information onto the disk D, and update TOD information which indicates time and date of update of the content of the file data written on the disk D. The read/write apparatus 200 shown in FIG. 2 has two slots for insertion of disk cartridges, and has a function allowing file data on one disk D1 to be copied onto the other disk D2.

The operation of copying of the read/write apparatus 200 shown in FIG. 2 will now be described with reference to a flow chart in FIG. 3.

Figure 3:
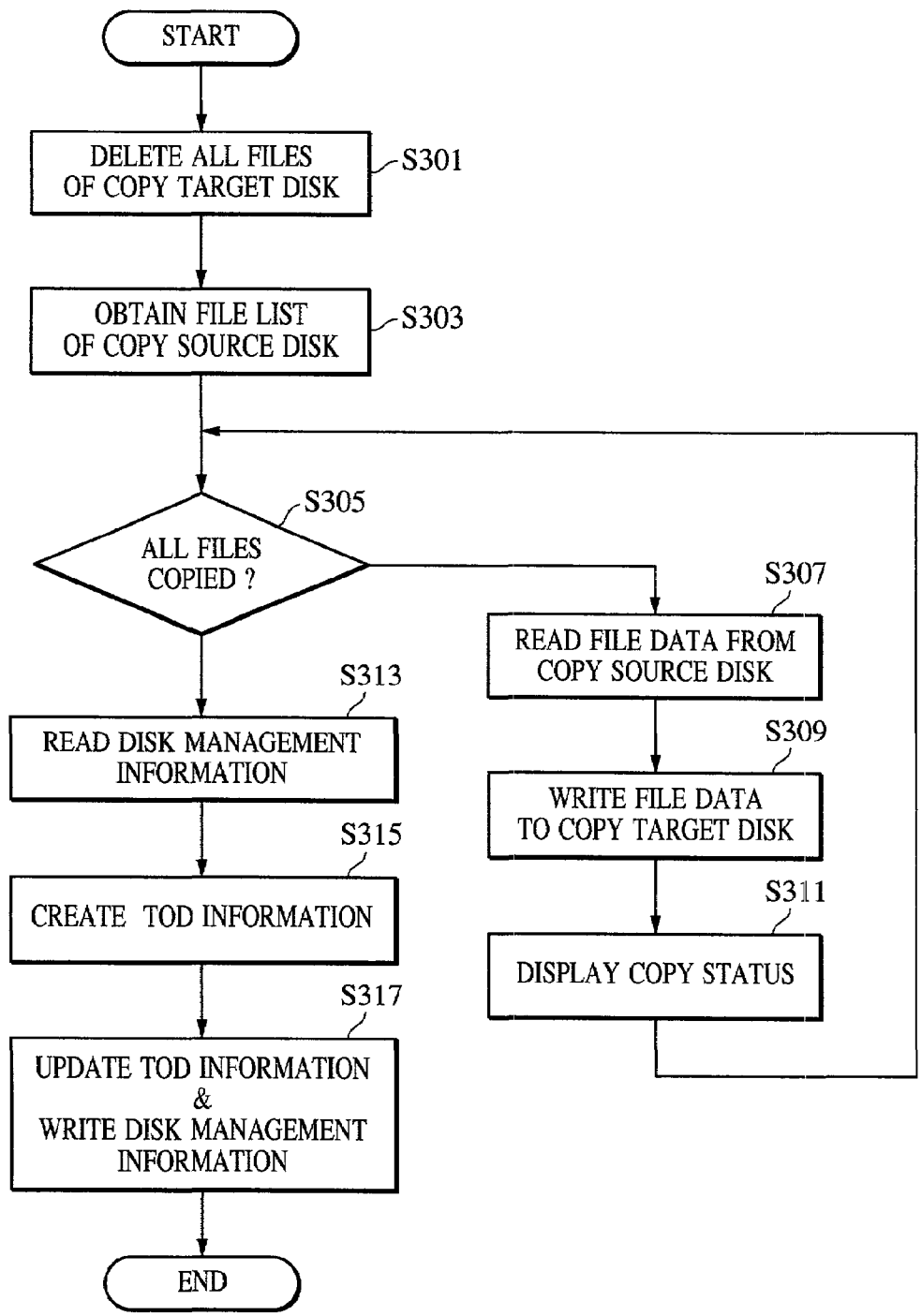
FIG. 3 is a flow chart showing an operation of copying a disk.

FIG. 3 is a flow chart illustrating a process of copying a disk, in which the entire content of disk D1 shown in FIG. 2 is copied onto disk D2.

Upon a user operating an operation unit 205 shown in FIG. 2 to give an instruction for copying disk D1, the process shown in FIG. 3 starts.

That is, upon the user operation of the operation unit 205 for copying, the operation unit 205 outputs to a copy management processor 207 a control signal representing a copy execution command. In response, the copy management processor 207 outputs a control signal to a write processor 211 to erase all files written on a target disk, i.e., disk D2 in this embodiment (step S301).

Upon receipt of the control signal for deleting the files, the write processor 211 controls a disk controller 209 to delete all the file data written on disk D2. A disk controller 201 and the disk controller 209 in this embodiment also have known optical pickups and disk drive mechanisms, respectively. Upon completion of the process of deleting the files, the write processor 211 outputs a notification indicating the completion thereof to the copy management processor 207.

Upon receipt of the notification of the file delete process, the copy management processor 207 outputs to a read processor 203 a control signal representing a read command to obtain file list information written on the source disk D1 (step S303). Disk D1 of this embodiment includes, in addition to the disk management information, the content of file data written on disk D1, such as time and date of creation and update of each file, and further includes, if the file data is image data, file list information containing index images representing respective files.

Upon receipt of the read command from the copy management processor 207, the read processor 203 controls the disk controller 201 to read the file list information of disk D1 and outputs the file list information to the copy management processor 207.

Upon receipt of the file, list information from the read processor 203, the copy management processor 207 stores the file list information in an internal memory and uses the file list information to copy the file data of disk D1 onto disk D2. Specifically, a determination is made first as to whether all the files are copied or not (step S305), and, when all the files are not copied, an instruction is given to the read processor 203 to read the files piece by piece from disk D1 (step S307). In this case, files to be copied are designated in the order of file list information such that no file is copied more than once.

The copy management processor 207 outputs to the write processor 211 the file data that has been read from disk D1 and a control signal for recording the file data (step S309). The write processor 211 controls the disk controller 209 to write the file data, which is output from the copy management processor 207, onto disk D2. Upon the completion of a single piece of the file data being written onto disk D2, the write processor 211 also outputs a notification of the completion to the copy management processor 207.

Upon receipt of the notification indicating that the copying of a single file is completed, the copy management processor 207 controls a display unit 213 to display the progress of the copying from disk D1 to disk D2 (step S311).

In this manner, all the files are copied by repeating the process from step S305 to step S311 in the order of the file list information in the number of the files.

When the copying of all the files is completed in step S305, the copy management processor 207 outputs to the read processor 203 a control signal for reading the disk management information written on the source disk D1 (step S313). In response to the control signal, the read processor 203 controls the disk controller 201 to read the disk management information from disk D1 and outputs the disk management information to the copy management processor 207.

Upon receipt of the disk management information from the read processor 203, the copy management processor 207 transmits the disk management information to a management information update unit 219.

Upon receipt of the disk management information, the management information update unit 219 outputs to a TOD information generator 217 a control signal for outputting current time and date information (step S315). In response to the control signal from the management information update unit 219, the TOD information generator 217 receives, in the same manner as in the first embodiment, the current time and date information from an internal clock 215, creates time and date information, and outputs the time and date information to the management information update unit 219.

Upon receipt of the current time and date information, the management information update unit 219 sets the creation TOD information within the copy management information of disk D1 to the current time and date information. Prior to the initialization process of step S301, the copy management processor 207 reads the disk management information written on disk D2, and then outputs the disk management information to the management information update unit 219. The management information update unit 219 alters the content identification information within the disk management information of disk D1 to the content identification information that has been read from disk D2. The other information, i.e., the initialization TOD information and the update TOD information from disk D1, are kept unchanged and used as-is.

The management information update unit 219 updates the disk management information in such a manner and transmits the disk management information to the copy management processor 207. The copy management processor 207 outputs to the write processor 211 the disk management information, which has been updated by the management information update unit 219, and a control signal for writing the disk management information to disk D2 (step S317). The write processor 211 controls the disk controller 209 to write the updated disk management information in a given area of the target disk D2.

In this manner, when copying a disk, the read/write apparatus 200 according to this embodiment alters the creation TOD information and the update TOD information on the basis of the current time and date information, and uses the initialization TOD information and the content identification information, as is, which are written on a target disk. In addition, when initializing a disk, as described in the first embodiment, values of the initialization TOD information, creation TOD information, and update TOD information are set to a value of the current time and date information.

Thus, if a value of the initialization TOD information and a value of the creation TOD information of a disk are the same, the disk can be identified as an original, i.e., source disk. In contrast, if the values thereof are different from each other, the disk can be identified as a copy.

It is therefore possible to provide more detailed disk management.

While, in the configuration shown in FIG. 2, disk copying is implemented with a single apparatus, for example, a plurality of the apparatuses shown in FIG. 1 can be used to achieve a function similar to that of the apparatus shown in FIG. 2.

A third embodiment of the present invention will now be described.

Figure 4:
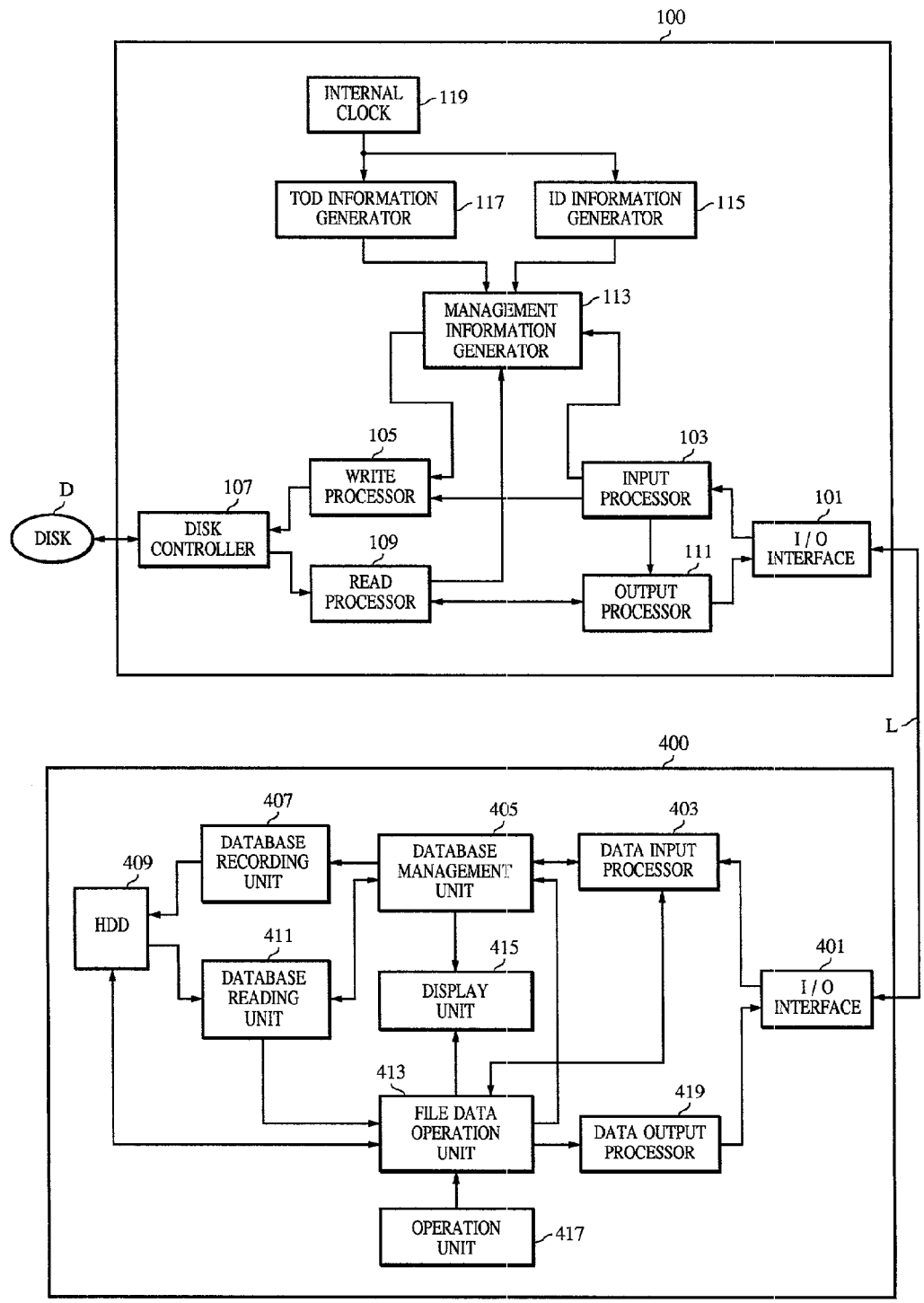
FIG. 4 is a block diagram showing a configuration of a disk management system to which the present invention is applied.

FIG. 4 is a block diagram illustrating the configuration of a disk management system using the read/write apparatus 100 shown in FIG. 1. In FIG. 4, the reference numeral 100 denotes a read/write apparatus 100 having the same configuration as in FIG. 1. The numeral 400 denotes a management device, which is typically a PC, and controls the read/write apparatus 100 to manage a disk by using a HDD (Hard Disk Drive) 409.

The management device 400, upon a user operation, controls the read/write apparatus 100 to record, read, or delete file data.

In the management device 400, the HDD 409 stores database for managing file data and disks. The database stores disk information corresponding to a plurality of disks that is placed in the read/write apparatus 100. When managing a plurality of disks, pieces of disk information which corresponds to the number of disks to be managed are stored in the database. The disk information of a copy, i.e., a newly created disk, is stored in the database as different information from that of an original disk.

The disk information includes all pieces of file management information written on each disk, in addition to the disk management information described above. As shown in FIG. 6, one piece of file management information is generated for each file. Thus, when a plurality of files is written on a single disk, pieces of file management information which correspond to the number of the files written on the disk are generated. As shown in FIG. 6, the disk management information and file management information for the same disk are associated with each other and stored on the HDD 409.

As shown in FIG. 7, the file management information contains a file type, file name, file path, file size, and time and date information. When the file data is, especially, still picture data, the file management information may further include reduced images for the image data as thumbnails. In addition, when the file data is motion picture data, the file management information may further include playback time of the motion picture and of any thumbnail images each generated from the image data of one frame at the head. When the file data is audio data, the file management information also includes time information of the audio data. Naturally, the file management information may contain other types of file management information.

In the system shown in FIG. 4, the input/output interface 101 of the read/write apparatus 100 and an input/output interface 401 of the management device 400 can send and receive data to and from each other through a communication line L capable of transmitting digital data. The input/output interface 101 and the input/output interface 401 may employ serial bus interfaces compatible with, for example, the IEEE 1394.

The operation of the disk management system thus configured will be described below.

Figure 5:
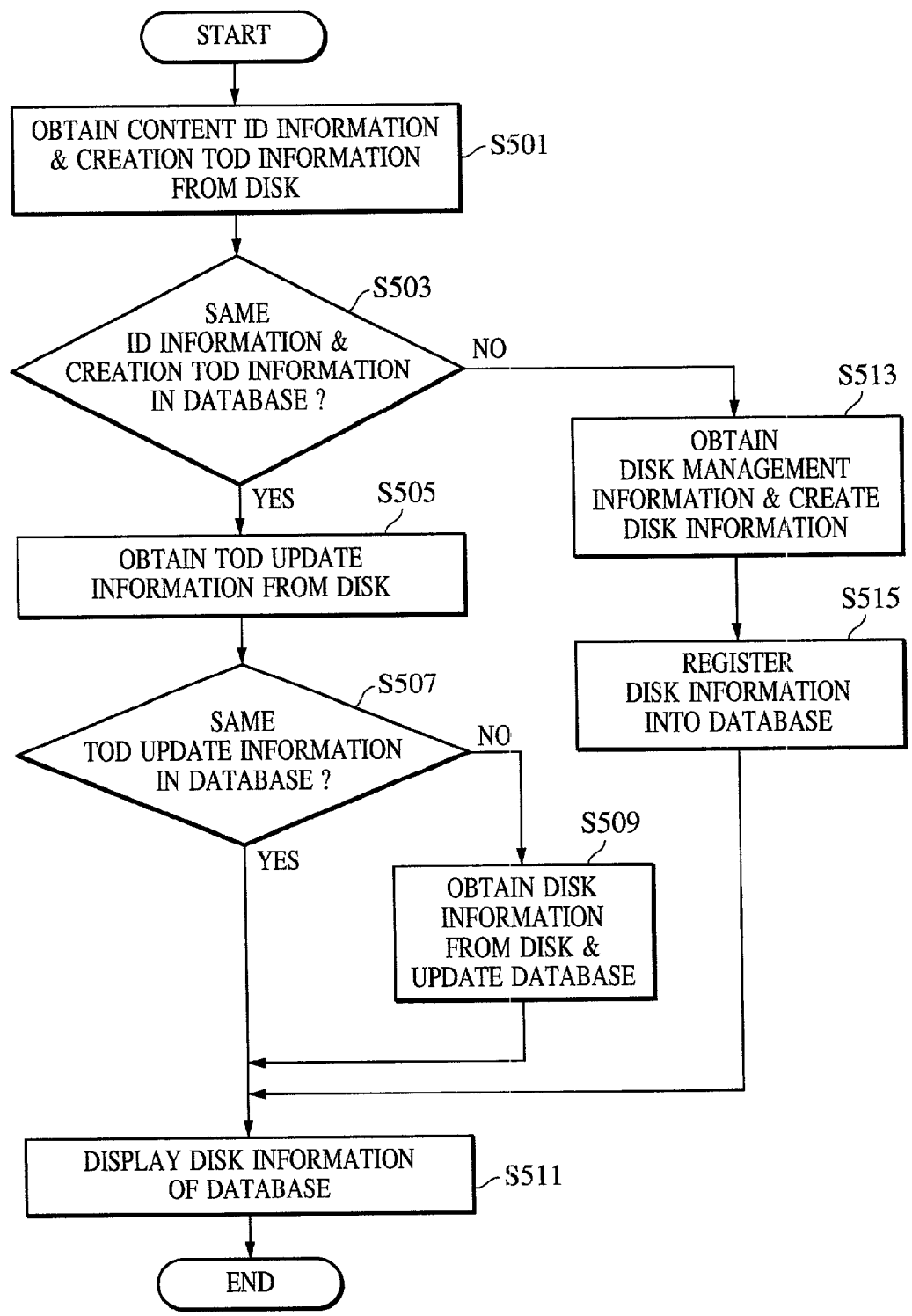
FIG. 5 is a flow chart showing processing of disk information upon the insertion of a disk.

First, a description will be made to the operation after the disk D is inserted into the read/write apparatus 100. Referring to FIG. 5, the operation of the management device 400 after the disk D is inserted in the read/write device 100 is shown in a flow chart.

Upon insertion of the disk D into the read/write apparatus 100, a sensor (not shown.) within the read/write apparatus 100 detects the insertion of the disk D, and the input/output interface 101 outputs; a notification indicating the insertion thereof to the input/output interface 401 of the management device 400. The input/output interface 401 then outputs a detection signal indicating the detection of the disk D to a database management unit 405 through a data input processor 403.

The database management unit 405 receives the detection signal and outputs to the data input processor 403 a control signal for reading the content identification information and the creation TOD information from the disk management information of the disk D (step S501).

Upon receipt of the read command for the content identification information and the creation TOD information from the database management unit 405, the data input processor 403 outputs a control signal indicating the read command to the read/write apparatus 100 through the input/output interface 401. The input/output interface 101 of the read/write apparatus 100 then receives the control signal and outputs the control signal to the data input processor 103 as described above. The data input processor 103 outputs to the data output processor 111 a read command for reading the disk management information from the disk D. Upon receipt of the read command, the data output processor 111 controls the disk controller 107 through the read processor 109 to read the disk management information from the disk D, so that the disk management information is output to the data output processor 111. The data output processor 111 extracts the content identification information and the creation TOD information from the disk management information and outputs the extracted information to the input/output interface 101. The input/output interface 101 then outputs the content management information and creation TOD information to the input/output interface 401 of the management device 400.

The input/output interface 401 outputs the content identification information and creation TOD information, which were received from the read/write apparatus 100, to the database management unit 405 through the data input processor 403. Upon receipt of the content identification information and creation TOD information of the disk D, the database management unit 405 stores the information in an internal memory. In addition, to check whether the content identification information and creation TOD information have been already registered in the database, the database management unit 405 also outputs a control signal to a database reading unit 411 to read all pieces of disk management information in the database stored in the HDD 409.

The database reading unit 411 reads the disk management information out of all the pieces of the disk information in the database stored in the HDD 409 in accordance with the control signal from the database management unit 405, and outputs the read information to the database management unit 405.

Upon receipt of all the pieces of the disk management information from the database, the database management unit 405 stores the information in the internal memory. The database management unit 405 then compares all the pieces of the disk management information read from the HDD 409 with the content identification information and the creation TOD information obtained from the disk D through the data input processor 403, to thereby detect disk information having the same content identification information and creation TOD information as those of the disk D from the disk management information read from the HDD 409 (step S503).

In this case, the reason why not only the content identification information but also the creation TOD information is compared is to register the copy as a different disk from the original disk. If no need exists for distinguishing the copy from the original, the comparison may be made using only the content identification information.

When the result of the comparison shows no match, the database management unit 405 identifies the disk D inserted into the read/write apparatus 100 as a disk read for the first time and registers new disk information into the database.

When the comparison shows that there is disk information having the same content identification data and creation TOD information as those of the disk D, the database management unit 405 identifies the disk D as a disk that has been read at least once, and further identifies whether the disk D has been updated since it was read in the past.

When the database management unit 405 identifies that the disk D has been updated since it was read in the past, the database management unit 405 creates new disk information to add the disk information of the disk D into the database.

First, the database management unit 405 outputs, to the read/write apparatus 100 through the data input processor 403 and the input/output interface 401, a control signal for requesting the transmission of the disk management information of the disk D. In response to the control signal from the input/output interface 401, the read/write apparatus 100 reads the disk management information from the disk D, as described above, and transmits the disk management information to the management device 400 through the input/output interface 101.

Subsequently, the database management unit 405 outputs a control signal for sequentially transmitting the file data of each file written on the disk D, through the data input processor 403 and the input/output interface 401. In response to the control signal for requesting the transmission of the file data, as described above, the read/write apparatus 100 reads data of each file from the disk D, and transmits the data to the management device 400 through the input/output interface 101.

The database management unit 405 detects the file type file name, file path, file size, and time and date information, on the basis of each file data transmitted through the input/output interface 401 and the data input processor 403, and creates the file management information in accordance with the detected information.

In particular, when the file is a still picture file containing still picture data and/or the file is a motion picture file containing motion picture data, the database management unit 405 creates a thumbnail from the input image data. When a thumbnail is contained in the image file itself, the thumbnail is extracted from the file. When no thumbnail is contained in the image file, no thumbnail is available for use as the file management information. However, a thumbnail may naturally be created from a corresponding image file using any appropriate means.

When the file is a motion picture file and/or an audio file, playback time information is detected. When the playback time information is contained in the file itself, the playback time information is extracted therefrom. When no playback time information is contained in the file, no playback time information is available. However, playback time information may naturally be calculated from a corresponding file using some kind of means.

The database management unit 405 generates the file management information for each of all the files written on the disk D, and generates the disk management information including the file management information for all the files to be written on the single disk D and the disk management information (step S513).

After completing the creation of the disk information for the disk D, the database management unit 405 outputs the disk information to a database recording unit 407. Upon receipt of the disk information from the database management unit 405, the database recording unit 407 appends and registers the new disk information into the database of the HDD 409 (step S515).

On the other hand, when the database management unit 405 determines that the disk D has been read at least once, the database management unit, 405 outputs, to the read/write apparatus 100 through the data input processor 403 and the input/output interfaces 401, a control signal for transmitting the update TOD information within the disk management information from the disk D (step S505).

Upon receipt of the transmission request, the read/write apparatus 100 extracts the update TOD information from the disk management information read from the disk D, as described above, and outputs the update TOD information to the management device 400.

Subsequently, the database management unit 405 receives the update TOD information thus transmitted through the input/output interface 401 and the data input processor 403, and stores the update TOD information in the internal memory. As described above, of the disk management information in the database read from the HDD 409, the database management unit 405 compares the update TOD information of the disk management information, which has the same content identification information and creation TOD information as those from the disk D, with the update TOD information read from the disk D at this time, thereby determining whether both of the update TOD information are the same (step S507).

When the result of the comparison shows that both of the update TOD information are the same, the inserted disk D is identified as a disk whose content has not been updated, and a display unit 415 displays the information of the database (step S511).

When the comparison shows that both of the TOD information are different from each other, the content of the disk D is determined to have been altered, and the database is then updated.

When the database management unit 405 determines that the content of the disk D has been updated, the database management unit 405 creates new disk information to update the disk information of the database stored in the HDD 409 (step S509). Since the creation of the disk information is the same as that in the case of the insertion of new disk D, the description thereof will be omitted.

Upon creating the disk information, the database management unit 405 outputs the disk information to the database recording unit 407.

In response to the output of the disk information from the database management unit 405, the database recording unit 407 stores the disk information into the HDD 409. Consequently, of the disk information stored in the HDD 409, disk information having values that respectively match those of the content identification information and the creation TOD information of the disk information output from the database management unit 405, is updated with the disk information output from the database management unit 405.

Upon the completion of updating the database stored in the HDD 409, the database management unit 405 uses the database reading unit 411 to read the disk information corresponding to the disk D from the HDD 409. The database management unit 405 then outputs the read disk information to the display unit 415.

Upon receipt of the disk information from the database management unit 405, the display unit 415 displays the disk management information and each management information of the disk information, for example, in the form of a list.

The process using the data thus stored in the HDD 409 and the file data written on -the disk D will now be described.

In the management device 400, upon the user operating an operation unit 407, processing can be performed, such as displaying disk information or file data stored in the HDD 409, deleting a file stored in the disk D by designating the file, appending file data stored in the HDD 409 to the disk D, storing the file data written on the disk D into the HDD 409 by designating the file data. In this case, the content of the disk D and the content of data of the HDD 409 can be displayed to the user through the display unit 415.

Thus, the user can check the file management information of the disk D displayed on the display unit 415 to designate a file to be deleted from the disk D or a file to be stored into the HDD 409, thereby allowing the file to be deleted or stored. When storing a file written on the disk D into the HDD 409, the user further designates a file path and file name indicating an address where the file is stored to thereby executing the file storage.

On the basis of file information, which is stored in the HDD 409, displayed on the display unit 415, the user can designate a file stored in the HDD 409 to write the file onto the disk D.

In this embodiment, while the file management information stored in the HDD 409 is used as a method of designating a file written on the disk D, an alternate method may be used to designate the file.

The process of displaying a file stored in the HDD 409 will now be described.

In response to the user operation of the operation unit 417 to give an instruction for displaying file information stored in the HDD 409 a file data operation unit 413 obtains file list information of files stored in the HDD 409. In this case, the management device 400 of this embodiment uses the file management information to create the file list information and stores the file list information in the HDD 409.

Subsequently, the file data operation unit 413 outputs the file list information to the display unit 415. The display unit 415 displays the file list information output from the file data operation unit 413.

The process of deleting a file in the disk D will now be described.

In response to the user operation of the operation unit 417 to designate the file management information of a file to be deleted, the file data operation unit 413 obtains the file management information of the designated file from the database of the HDD 409.

In accordance with the obtained file management information, the file data operation unit 413 outputs a file data delete request to a data output processor 419. The data output processor 419 transmits the received file data delete request to the read/write apparatus 100 through the input/output interface 401.

Upon receipt of the file data delete request from the input/output interface 401, as described above, the read/write apparatus 100 deletes the designated file written on the disk D.

Subsequently, the file data operation unit 413 outputs a database update command to the database management unit 405. Upon receipt of the database update command, the database management unit 405 updates the database stored in the HDD 409 to delete disk information concerning the deleted file.

The process of storing file data of the disk D into the HDD 409 will now be described.

Upon the user operating the operation unit 417 to store file data of the disk D into the HDD 409 by designating the file management information of the disk D and the file path and file name of a destination address, the file data operation unit 413 obtains the file management information of the designated file through the database reading unit 411.

In accordance with the file management information, the file data operation unit 413 outputs to the data input processor 403 a read command for reading the designated file. Upon receipt of the file read command from the data input processor 403, the data input processor 403 outputs the read command for the designated file data to the read/write apparatus 100 through the input/output interface 401. As described above, the read/write apparatus 100 reads the designated file data from the disk D and outputs the file data to the management device 400 through the input/output interface 101.

The input/output interface 401 outputs the file data, output from the read/write apparatus 100, to the file data operation unit 413 through the data input processor 403. The file data operation unit 413 stores the file data, output from the data input processor 403, into the HDD 409 using the designated file path and file name.

The operation of appending a file stored in the HDD onto the disk D will now be described.

Upon the user operating the operation unit 417 to designate a file stored in the HDD 409 for instructing the file to be added to the disk D, the file data operation unit 413 reads the designated file from the HDD 409. The file data operation unit 413 then outputs the file to the data output processor 419. The data output processor 419 transmits the file data to the read/write apparatus 100 through the input/output interface, 401. Upon receipt of the file data and an write instruction, from the management device 400, as described above, the read/write apparatus 100 writes the received file data onto the disk D.

Subsequently, the file data operation unit 413 outputs an update command for updating the database to the database management unit 405. In response to the update command, the database management unit 405 updates the database to alter the update TOD information and the file management information concerning the disk D.

As described above, when a new disk is inserted in the apparatus, the arrangement according to this embodiment can identify whether or not the disk has been read in the past, without reading all the files.

This arrangement can also expedite the checking of an updated content of a disk without thoroughly checking the entire content of the disk, thereby allowing for simpler and faster disk management.

While a description has been given in the above embodiments in the context of magnetic optical disks such as DVDs, likewise, the present invention is applicable to other recording media, including magnetic tapes, magnetic disks, and semiconductor memory cards such as SD memory cards, and multimedia cards.

While processing of information data, disk management information, and disk information has been implemented with the hardware configurations, the processing may also be accomplished with software configurations using a microcomputer.

In such a case, the features of the embodiments described above are implemented with software program code. Such program codes, means for supplying the program codes to a computer, such as storage medium storing the program codes, and the like are covered by the present invention. Examples of applicable storage media for storing such program codes include floppy disks, hard disks, magnetic optical disks, CD-ROMS, magnetic tapes, nonvolatile memory cards, and ROMs (Read Only Memories).

In addition, the present invention covers not only the case in which the supplied program codes are executed by a computer to implement the features of the embodiments described above, but also the case in which the program codes are executed in cooperation with an OS (Operating System) running in the computer or in cooperation with other application software to implement the features illustrated in the embodiments described above.

In addition, the present invention encompasses the case in which the supplied program codes are stored in a memory provided in an add-in board of a computer or an enhancement unit connected to a computer and then, on the basis of instructions of the program codes, a CPU provided in the add-inn board or enhancement unit performs the whole or part of the actual processing to achieve the features of the embodiments described above.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A data processing apparatus comprising:
   information data processing means for obtaining information data to be written on a first recording medium;
   management information processing means for generating recording medium management information concerning the first recording medium, the recording medium management information including (i) initialization time-and-date information concerning time and date of initialization of the first recording medium, (ii) creation time-and-date information concerning time and date of creation of the recording medium management information, and (iii) update time-and-date information concerning time and date of update of information data written on the first recording medium; and
   writing means for writing the information data and the recording medium management information onto the first recording medium.

2. An apparatus according to claim 1, wherein the recording medium management information further includes identification information that is unique to the first recording medium, and said management information processing means generates the identification information.

3. An apparatus according to claim 2, wherein said management information processing means generates the identification information using an ID unique to the apparatus and a random number.

4. An apparatus according to claim 1, wherein said management information processing means further changes the content of the update time-and-date information in response to an instruction for deleting information data written on the first recording medium, and said writing means writes the recording medium management information including the changed update time-and-date information onto the first recording medium.

5. An apparatus according to claim 4, further comprising clock means for indicating current time and date, wherein said management information processing means changes the update time-and-date information in accordance with time and date information indicated by said clock means at the time of the instruction for deleting the information data.

6. An apparatus according to claim 1, wherein, in a copy mode in which all information data written on a second recording medium is written onto the first recording medium, said management information processing means changes the content of the creation time-and-date information without changing the contents of the initialization time-and-date information and the update time-and-date information of the recording medium management information concerning the second recording medium, and said writing means writes the recording medium management information concerning the second recording medium including the changed creation time-and-date information onto the first recording medium.

7. An apparatus according to claim 1, wherein said management information processing means further changes the content of the update time-and-date information in response to an instruction for writing information data onto the first recording medium, and said writing means writes the recording medium management information including the changed update time-and-date information onto the first recording medium.

8. An apparatus according to claim 7, further comprising clock means for indicating current time and date, wherein said management information processing means changes the update time-and-date information in accordance with time and date information from said clock means at the time of the instruction for writing the information data.

9. An apparatus according to claim 1, wherein said management information processing means changes the contents of the initialization time-and-date information, the creation time-and-date information, and the update time-and-date information in response to an, instruction for initializing the first recording medium, and said writing means writes the recording medium management information including the changed update time-and-date information onto the first recording medium.

10. An apparatus according to claim 9, wherein said management information processing means further changes all of the initialization time-and-date information, the creation time-and-date information, and the update time-and-date information to a value indicating time and dates of the initialization in response to the instruction for the initialization.

11. An apparatus according to claim 1, wherein the information data includes image data and audio data.

12. A data processing apparatus which reads information data from a first recording medium and writes the information data to a second recording medium, the data processing apparatus comprising:
    reading means for reading information data and first recording medium management information from the first recording medium, the first recording medium management information including (i) initialization time-and-date information concerning time and date of initialization of the first recording medium, (ii) creation time-and-date information concerning time and date of creation of the recording medium management information, and (iii) update time-and-date information concerning time and date of update of the information data written on, the first recording medium;
    management information processing means for generating second recording medium management information by changing, of the first recording medium management information read from said reading means, the content of the creation time-and-date information without changing the initialization time-and-date information and the update time-and-date information; and
    writing means for writing the information data read by said reading means and the second recording medium management information onto the second recording medium.

13. A method for processing data, comprising:
    an obtaining step, of obtaining information data to be written on a first recording medium;
    a processing step, of generating recording medium management information concerning the first recording medium, the recording medium management information including (i) initialization time-and-date information concerning time and date of initialization of the first recording medium, (ii) creation time-and-date information concerning time and date of creation of the recording medium management information, and (iii) update time-and-date information concerning time and date of update of information data written on the first recording medium; and
    a writing step, of writing the information data and the recording medium management information onto the first recording medium.

14. A method according to claim 13, wherein the recording medium management information further includes identification information that is unique to the first recording medium, and the processing step further includes generating the identification information.

15. A method according to claim 14, wherein the processing step includes generating the identification information using an ID unique to the apparatus and a random number.

16. An method according to claim 13, wherein the processing step further includes changing the content of the update time-and-date information in response to an instruction for deleting information data written on the first recording medium, and the writing step includes writing the recording medium management information including the changed update time-and-date information onto the first recording medium.

17. A method according to claim 16, further comprising a clocking step, of indicating current time and date, wherein the processing step includes changing the update time-and-date information in accordance with time and date information provided in the clocking step at the time of the instruction for deleting the information data.

18. A method according to claim 13, wherein, in a copy mode in which all information data written on a second recording medium is written onto the first recording medium, the processing step includes changing the content of the creation time-and-date information without changing the contents of the initialization time-and-date information and the update time-and-date information of the recording medium management information concerning the second recording medium, and the writing step includes writing the recording medium management information concerning the second recording medium including the changed creation time-and-date information onto the first recording medium.

19. A method according to claim 13, wherein the processing step further includes changing the content of the update time-and-date information in response to an instruction for writing information data onto the first recording medium, and the writing step includes writing the recording medium management information including the changed update time-and-date information onto the first recording medium.

20. A method according to claim 19, further comprising a clocking step, of indicating current time and date, wherein the processing step includes changing the update time-and-date information in accordance with time and date information provided in the clocking step at the time of the instruction for writing the information data.

21. A method according to claim 13, wherein the processing step includes changing the contents of the initialization time-and-date information, the creation time-and-date information, and the update time-and-date information in response to an instruction for initializing the first recording medium, and the writing step includes writing the recording medium management information including the changed update time-and-date information onto the first recording medium.

22. A method according to claim 21, wherein the processing step further includes changing all of the initialization time-and-date information, the creation time-and-date information, and the update time-and-date information to a value indicating time and date of the initialization in response to the instruction for the initialization.

23. A method according to claim 13, wherein the information data includes image data and audio data.

24. A method for reading information data from a first recording medium and writing the information data to a second recording medium, the method comprising:

a reading step, of reading information data and first recording medium management information from the first recording medium, the first recording medium management information including (i) initialization time-and-date information concerning time and date of initialization of the first recording medium, (ii) creation time-and-date information concerning time and date of creation of the recording medium management information, and (iii) update time-and-date information concerning time and date of update of the information data written on the first recording medium;

a processing step, of generating second recording medium management information by changing, of the first recording medium management information read in the reading step, the content of the creation time-and-date information without changing the initialization time-and-date information and the update time-and-date information; and a writing step, of writing the information data read in the reading step and the second recording medium management information onto the second recording medium.

* * * * *

UNITED STATES PATENT AND TRADEMARK OFFICE
CERTIFICATE OF CORRECTION

PATENT NO.       : 7,061,836 B2
APPLICATION NO.  : 10/042369
DATED            : June 13, 2006
INVENTOR(S)      : Takuma Mikawa It is certified that error appears in the above-identified patent and that said Letters Patent is hereby corrected as shown below:

COLUMN 1

Line 39, "alternation" should read --alteration--.

COLUMN 2

Line 13, "Writing" should read --A writing--.

COLUMN 3

Line 39, "a instruction" should read --an instruction--;
Line 56, "It should be noted that the term "TOD" is" should be deleted; and
Line 57, "referred to as "time-and-date"." should be deleted.

COLUMN 4

Line 17, "Identification" should read --identification--; and
Line 41, "file date" should read --file data--.

COLUMN 6

Line 66, "file, list" should read --file list--.

COLUMN 9

Line 21, "made to" should read --made as to--; and
Line 29, "outputs;" should read --outputs--.

COLUMN 11

Line 39, "unit," should read --unit--.

COLUMN 12

Line 35, "on -the" should read --on the--; and
Line 52, "stored to" should read --stored,--.

UNITED STATES PATENT AND TRADEMARK OFFICE
CERTIFICATE OF CORRECTION

PATENT NO. : 7,061,836 B2
APPLICATION NO. : 10/042369
DATED : June 13, 2006
INVENTOR(S) : Takuma Mikawa It is certified that error appears in the above-identified patent and that said Letters Patent is hereby corrected as shown below:

COLUMN 13

Line 67, "interface," should read --interface--; and
Line 67, "an write" should read --a write--.

COLUMN 14

Line 1, "instruction," should read --instruction--.

COLUMN 16

Line 7, "to an," should read --to an--; and
Line 35, "written on," should read --written on--.

COLUMN 17

Line 7, "An method" should read --A method--.

Signed and Sealed this

Twenty-sixth Day of December, 2006

JON W. DUDAS
*Director of the United States Patent and Trademark Office*